United States Patent [19]

Lagabe

[11] Patent Number: 5,094,467
[45] Date of Patent: Mar. 10, 1992

[54] PIPE GASKET WITH LIMITED PENETRATION LOCKING ELEMENTS

[75] Inventor: Andre Lagabe, Pont-A-Mousson, France

[73] Assignee: Pont-A-Mousson S.A., Nancy, France

[21] Appl. No.: 545,735

[22] Filed: Jun. 29, 1990

[30] Foreign Application Priority Data

Jun. 30, 1989 [FR] France ................. 89 09011

[51] Int. Cl.$^5$ .............................................. F16L 17/00
[52] U.S. Cl. .......................... 277/207 A; 277/DIG. 2; 285/105; 285/374
[58] Field of Search ..................... 277/207 A, DIG. 2; 285/104, 105, 374

[56] References Cited

U.S. PATENT DOCUMENTS

| 1,928,821 | 10/1933 | Santiago | 285/105 |
|---|---|---|---|
| 3,018,785 | 1/1962 | Adams et al. | |
| 3,185,504 | 5/1965 | Perrot et al. | 285/105 |
| 3,877,733 | 4/1975 | Straub | 285/105 |
| 3,963,298 | 6/1976 | Seiler | 285/105 |
| 4,146,254 | 3/1979 | Turner et al. | 285/105 |
| 4,593,943 | 6/1986 | Hama et al. | 285/105 |
| 4,662,662 | 5/1987 | Delhaes | 277/207 A |
| 4,848,805 | 7/1989 | Bucher et al. | 285/374 |

FOREIGN PATENT DOCUMENTS

| 2606643 | 8/1977 | Fed. Rep. of Germany | 285/105 |
|---|---|---|---|
| 3405988 | 8/1985 | Fed. Rep. of Germany . | |
| 1490680 | 8/1967 | France | 285/104 |
| 1591079 | 4/1970 | France . | |
| 2584473 | 1/1987 | France . | |
| 6406152 | 1/1965 | Netherlands | 285/105 |
| 2034841 | 6/1980 | United Kingdom | 285/104 |

Primary Examiner—William A. Cuchlinski, Jr.
Assistant Examiner—Daniel G. DePumpo
Attorney, Agent, or Firm—Sughrue, Mion, Zinn, Macpeak and Seas

[57] ABSTRACT

An annular elastomeric gasket (3) for a female pipe socket includes locking elements (E) having an outer extremity 15 intended to bear against an inner surface of the socket and an inner extremity 18 intended to penetrate the outer surface of a male pipe end. The locking elements have shoulders (21) for limiting their penetration into the male pipe.

5 Claims, 2 Drawing Sheets

PIPE GASKET WITH LIMITED PENETRATION LOCKING ELEMENTS

BACKGROUND OF THE INVENTION

This invention relates to locked joints for male and female socket pipes with an annular elastomeric gasket being placed in between, and to a gasket for telescopic locked joints in which the male end of one of the pipes penetrates into the socket of the other pipe while at the same time compressing the gasket radially.

When a seal is made, axial movements of one pipe relative to the other which may occur subsequently should be prevented. Indeed, such movements are likely to weaken the satisfactory leaktightness of the joint or even to completely disconnect the initially joined pipes. This problem becomes particularly critical in the case of ducts transporting pressurized fluids; the pressure of the fluid generates substantial forces which tend to separate the elements forming the joint.

Gaskets are known into which regularly distributed locking elements, situated in the front part of the gasket on the open side of the socket, are inserted. In French patent No. 1,490,680, for example, the locking elements, consisting of metal inserts, may rotate by sliding against the inner surface of the socket. The locking elements function by being braced at one of their extremities against an inner face of the socket and, at their opposite extremity, against the outer surface of the male end into which they penetrate with their bevelled profile.

Depending on the manufacturing tolerances of the male end and he point of a metal insert relative to the outer surface of the male end into which it penetrates may vary. In order to obtain an optimum locking, this angle must be situated between certain limits which depend on the desired strength of locking, on the material of the pipes to be connected and on the surface finish of the pipes. If the angle made by the insert with the outer surface of the male end is too small, the locking insert merely rubs against the male end without ensuring actual locking. If the angle is too great, the component of the bracing force parallel to the male end becomes too small to ensure effective locking.

Experience has shown that the metal locking inserts sometimes tend to continue their penetration into the outer surface of the male end during backward or withdrawal movements of the male end relative to the socket. This results in an artificial reduction in the length of the inserts, which promotes their tilting beyond the limits of inclination which must be maintained, and reduces the bracing effect. This furthermore gives rise to a deterioration of the male end which may become as serious as it being pierced or its inner coating coming apart.

SUMMARY OF THE INVENTION

An object of the present invention is thus to overcome this problem by providing an elastomeric gasket for connecting together a male pipe end and a female pipe socket, in which gasket locking elements are arranged having one extremity intended to bear against an inner surface of the socket and one extremity intended to penetrate the outer surface of the male end, with means for limiting the penetration of the locking elements into the outer surface of the male end.

DETAILED DESCRIPTION OF THE PREFERRED EMBODIMENT

Figure 1:
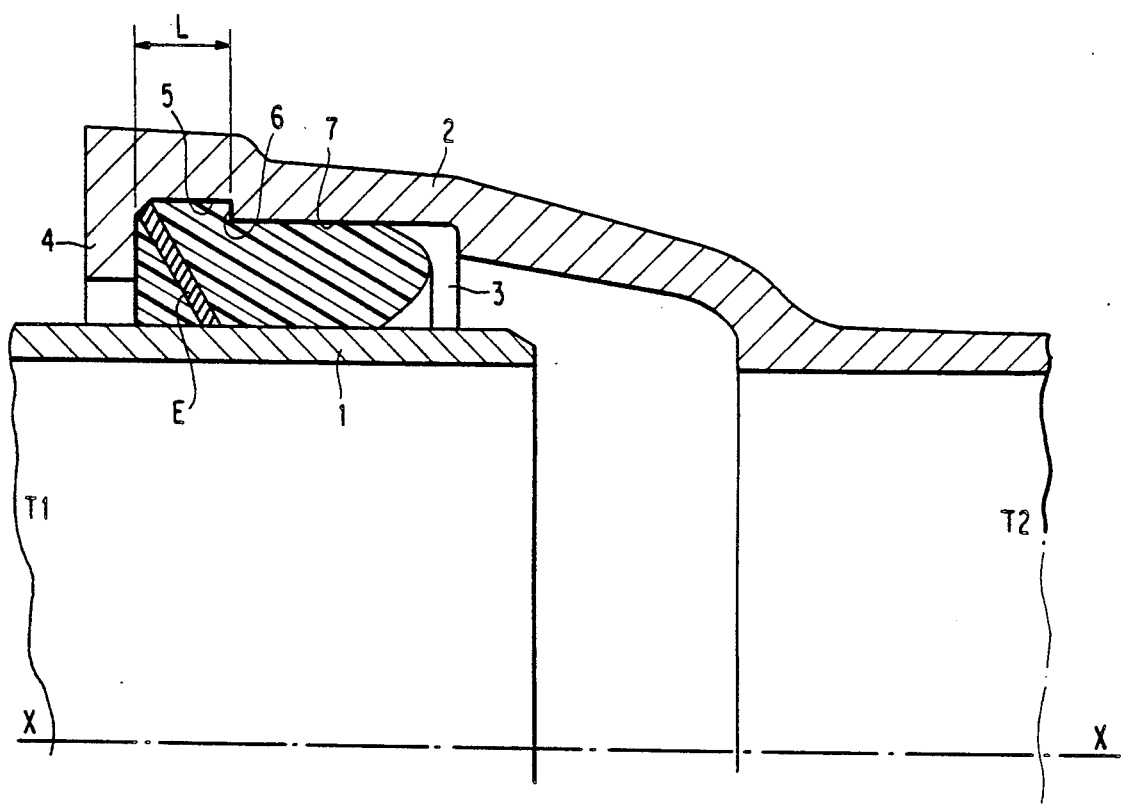
FIG. 1 is an axial cross-section of a sealed joint provided with a gasket according to the invention.

As shown in FIG. 1 a sealed joint consists of a male end 1 of a pipe T1 and a female socket 2 of a second pipe T2 coaxial with axis X—X, an elastomeric gasket 3 being placed between the male end and the socket, and provided with metal locking elements E.

The socket 2 has at its entrance end, following a collar 4, a cylindrical groove 5 of axial length L followed, after a radial step formed by a shoulder 6 by a cylindrical wall 7 having a diameter less than the internal diameter of the groove 5.

Figure 2:
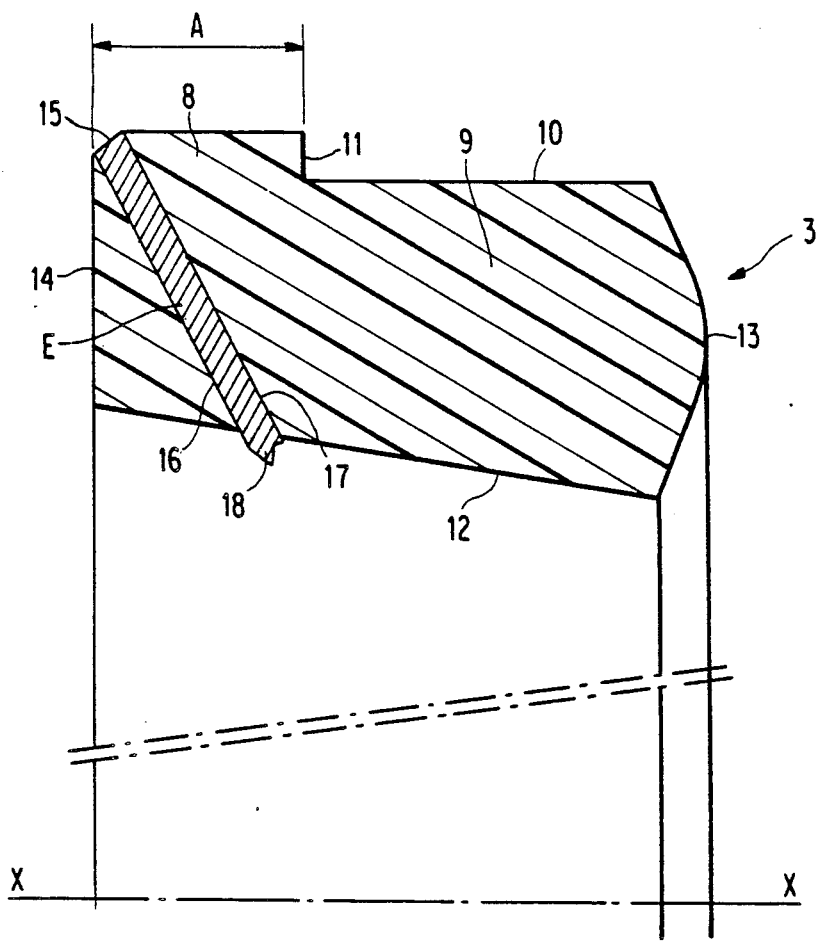
FIG. 2 is an axial cross-section of a gasket according to the invention.

The gasket 3, as shown in FIG. 2, has, on its outer surface, an anchoring heel 8 of width A corresponding to the axial length of the groove 5 of the socket. The outer surface of the anchoring heel 8 is cylindrical about axis X—X, and it is extended by a sealing body 9 with an outer surface of revolution 10 cylindrical about axis X—X. The anchoring heel 8 is connected to the surface 10 by a transverse cheek 11 which forms a step between the peripheral surfaces of the anchoring heel and the sealing body.

The external diameter of the anchoring heel 8 corresponds to the internal diameter of the groove 5 of the socket, and the outer surface of the gasket formed by the anchoring heel, the cheek 11 and the surface 10 has a profile corresponding to the inner profile of the socket formed by the groove 5, the shoulder 6 and the wall 7.

The gasket has, on its inner face, a frustoconical surface 12 which is connected to the surface 10 of the sealing body by a curved surface 13. The sealing body is therefore limited by the surfaces 10, 12 and 13.

The gasket is limited, at its opposite end, by a radial face 14 which is connected to the anchoring heel 8 by a chamfer 15. The radial surface 14 and the chamfer 15 are intended to contact a corresponding inner surface of the collar 4 of the socket.

The diameter of the ridge formed by the faces 12 and 13 of the sealing body is smaller than the diameter of the ridge formed by the faces 12 and 14, the diameter of the male end 1 of the pipe T1 lying between these two diameters.

The gasket is provided, regularly distributed around its periphery, with slots in which the locking elements E, which extend from the anchoring heel 8 to the frustoconical surface 12 of the gasket, are placed. As an alternative, the gasket could be moulded onto the locking elements.

Each locking element E has an outer end flush with the anchoring heel 8 and an inner end which projects from the frustoconical surface 12 inside the gasket.

Figure 3:
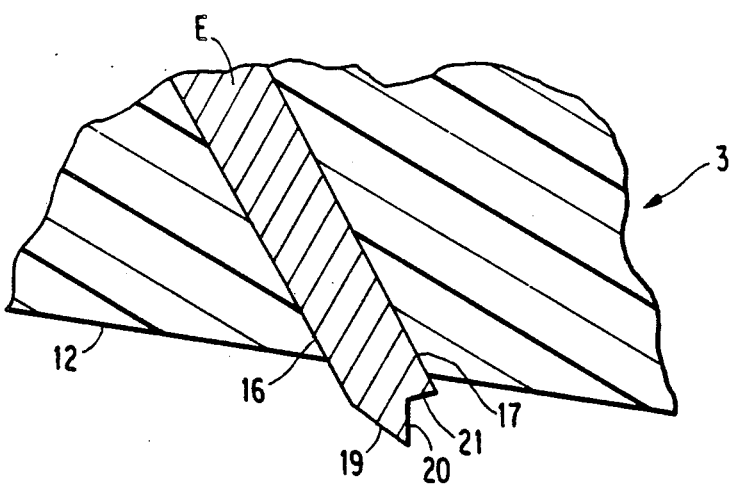
FIG. 3 is a detailed cross-section of a locking element of a gasket according to the invention.

As can be seen in FIGS. 2 and 3, the inner end of a locking element E which projects from the surface 12 consists of two faces 16 and 17, planar and parallel, terminating in a sharp edged bevel 18 consisting of two planar faces 19 and 20.

The face 19 is connected to the face 16, while the face 20 is connected to the face 17 via a shoulder 21 serving to limit the penetration of the bevel 18 into the outer surface of the male pipe, the face 16 being on the side of the radial face 14 of the gasket and the face 17 being on the side of the curved surface 13 of the gasket. Alternatively, the faces 19 and 16 may be merged to form a single surface.

The shoulder 21 is a planar surface parallel to the male pipe end when the limit of inclination of the locking element E relative to the male end has been reached.

During assembly, after having introduced the gasket 3 into its housing in the socket 2, the anchoring heel 8 being in the groove 5 and the surface 10 of the sealing body 9 being in contact with the surface 7 of the socket, the male end of a pipe T1 is introduced into the socket. The male end inclines the locking elements E and, coming into contact with the surface 12 of the gasket, compresses the sealing body 9. When the male end is first moved rearwardly out of the socket, the bevel 18 of each locking element E penetrates into the outer surface of the male end. This penetrating movement is accompanied by a slight rotation of the insert E about its outer end in contact with the inner surface of the socket, made possible by the penetration of the bevel 18 into the male end. Once the bevel has penetrated to a point where its shoulder 21 is in contact with the outer surface of the male end, the shoulder, like the guard of a sword, prevents any further penetration of the bevel into the male end.

The effective or usable length of the insert, which renders the bracing phenomena possible, thus remains constant. Any additional rotation of the insert E becomes impossible, and an efficient locking is thus obtained.

I claim:

1. An annular elastomeric gasket (3) for connecting together a male pipe end (1) and a female pipe socket (2), comprising: a plurality of elongate locking elements (E) disposed in the gasket equally spaced around a periphery thereof and inclined at an angle to an axis thereof, each locking element having a blunt outer end intended to pivotally against an outermost inner corner of the socket and an inner end defining a sharp knife edge for penetrating an outer surface of the male pipe end, and means (21) contiguous with the knife edge for limiting the penetration of said knife edge into the outer surface of the male pipe end, wherein the penetration limiting means comprises a flat shoulder defined on an innermost side of the knife edge of each locking element, said shoulder being oriented substantially parallel to a longitudinal axis of the male pipe end when a limit of inclination of an associated locking element has been reached, and said shoulder lying at an inwardly directed, acute angle to said longitudinal axis when said limit of inclination has not yet been reached.

2. A gasket according to claim 1 having, on an outer side an anchoring heel (8) intended to be housed in a groove (5) provided on an inner surface of the socket and, on an inner side, a surface (12) intended to engage the outer surface of the male pipe end, each locking element (E) having said outer end flush with the anchoring heel and said inner end projecting from the inner side surface (12) of the gasket.

3. A gasket according to claim 2, wherein the inner end of each locking element is defined by two planar, parallel faces (16, 17) terminating in a bevel (18) formed by two planar, converging faces (19, 20).

4. A gasket according to claim 1, wherein each locking element defines a single sharp inner edge.

5. A gasket according to claim 4, wherein each flat shoulder is substantially perpendicular to a longitudinal axis of an associated locking element.

* * * * *